Nov. 15, 1960 H. H. ADELAAR 2,960,623

ELECTRICAL PULSE DISTRIBUTORS

Filed July 28, 1958

Inventor
H. ADELAAR

By Robert Harding Jr.
Attorney

United States Patent Office 2,960,623

Patented Nov. 15, 1960

2,960,623

ELECTRICAL PULSE DISTRIBUTORS

Hans Helmut Adelaar, Antwerp, Belgium, assignor to International Standard Electric Corporation, New York, N.Y., a corporation of Delaware Filed July 28, 1958, Ser. No. 751,391

Claims priority, application Netherlands Sept. 17, 1957

4 Claims. (Cl. 315—84.5)

Figures 1, 2, 3:
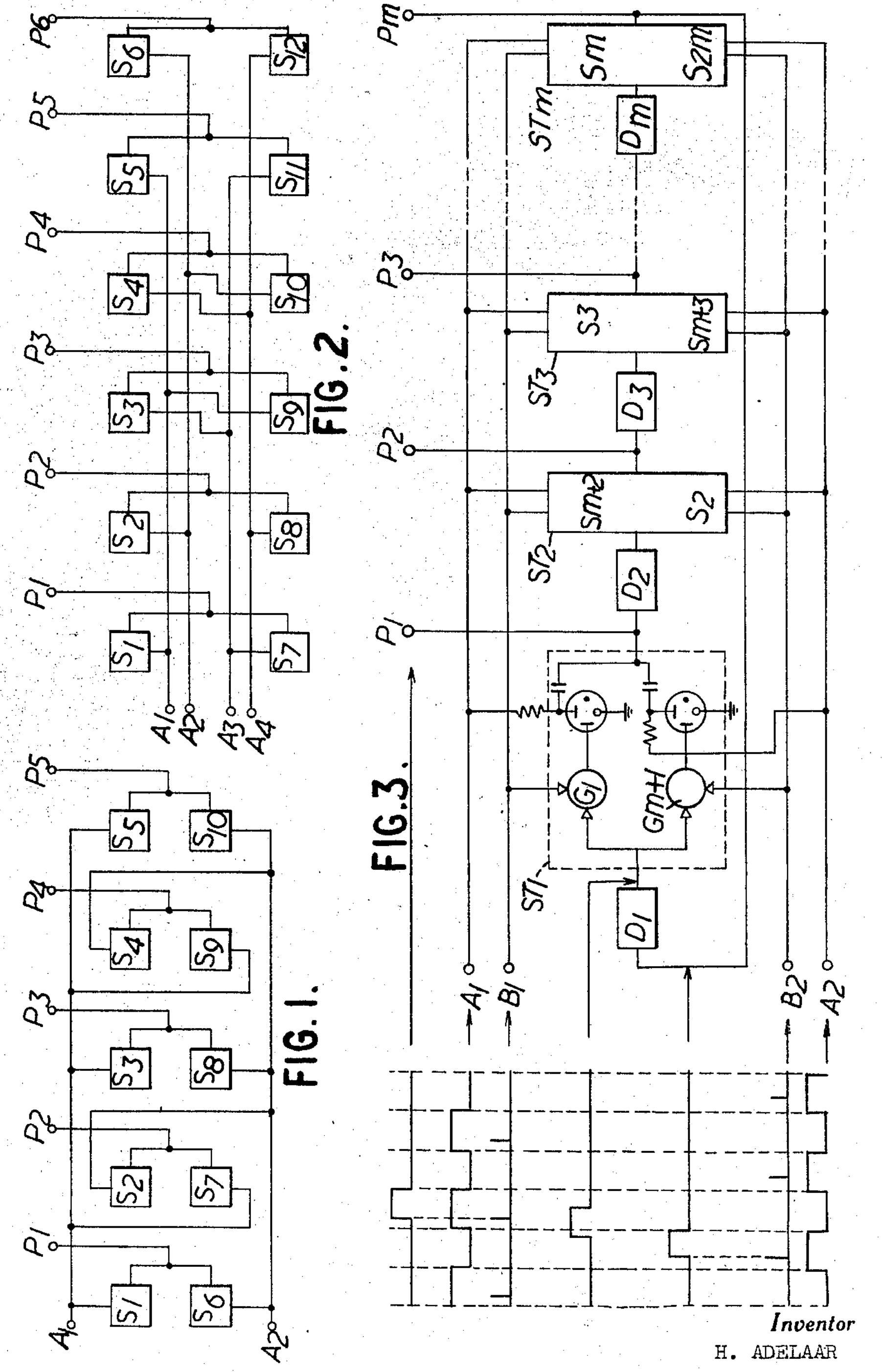

The invention relates to electrical pulse distributors or ring counters.

More particularly it concerns electrical pulse distributors or ring counters comprising a plurality of $m$ switches, e.g. thyratrons, arranged to be cyclically closed one after the other and one a a time in response to the application of one or more series of input pulses so that they may produce $m$ series of output pulses at $m$ outlets respectively, each corresponding to a switch, and wherein said $m$ switches are divided into $n$ groups, $n$ being larger than 1 and smaller than $m$, such that for any set of $n$ switches which are successively operated, each of these switches pertains to a different group. Such an arrangement is known from the British Patent No. 592,794.

Electrical pulse distributors or counters of the above type may be advantageous for at least two reasons.

First, considering a ring counter driven by a single series of input pulses simultaneously applied to all stages of the counter, any input pulse will tend to drive all the stages of the counter in a first condition. Normally, all stages except one may already be in this first condition while the remaining stage is in the second condition. This particular stage in the second condition will therefore be driven to the first condition and this will create a priming pulse for the next stage so as to drive this next stage from the first to the second condition, thereby advancing the ring counter by one step, as required. Yet, the action of the input pulses applied in common to all the stages tends to drive all stages to their first condition, and, considering the next stage to be driven into the second condition, this action is therefore in opposition to the one derived from the transfer of the preceding stage from its second to its first condition. In general, there is therefore some delay in the actual transfer of a stage from the first to the second condition until the effect of the input pulse has subsided and this limits the speed of operation.

This delay may be materially reduced by dividing the stages into two groups, one comprising the odd and the other the even stages, said groups being respectively driven by two separate series of input pulses, the pulses of the first series alternating with those of the second series. In this manner, as an input pulse causes a stage to be driven back to the first condition, the generated priming pulse applied to the next stage will not be counteracted by the input pulse which is not applied to that next stage.

It is clear however that this improved arrangement can only be used when $m$, the number of stages, is even, or more generally, when $m$ is a multiple of $n$, if the input pulses are subdivided into more than two staggered series, as otherwise the cyclic operation required in a ring counter could not be secured.

A second reason justifying the advantage of the division of the $m$ switches into $n$ groups may be seen by considering the generation of staggered series of power pulses by using for the distributor stages gas tubes such as thyratrons and in which the control grid does not retain control of the state of conductivity of the tube after the latter has been ionized. In such a case, it is essential to interrupt the main discharge path of the tube acting as a switch, in order to terminate the pulse generated by the ionization of the tube. One may then conceive a regularly interrupted power supply for the anode voltage of the thyratrons so that the latter may be de-ionized after an input pulse applied at the control grid has succeeded in striking the tube. It is clear however that some minimum time must be allowed for the de-ionization of the tube and this can normally only be obtained out of the period T separating pulses successively appearing at adjacent outlets of the pulse distributor. Also, the input pulses should appear at the control electrodes of the thyratrons during the time that the anode receives a suitable supply voltage. This means that, for a predetermined frequency of operation, i.e. for a predetermined value of T, conditioned by the use to which the pulses are to be put, the provision of a suitable de-ionization time for the thyratrons in order to avoid upon reapplication of a suitable voltage at the anode, the undesired re-ionization of the main discharge path, before the appearance of an input pulse at the control electrode, will be obtained at the expense of the length of the output pulse which will only be a fraction of the period T. Yet, not only the period T but also the length of the output pulse is conditioned by the circuits in relation with which the pulse distributor is used.

By splitting the $m$ switches, i.e. the thyratrons, into $n$ groups and by using an $n$ phase anode power supply for the tubes, each phase corresponding to one of the $n$ groups of tubes, one will be able to provide a de-ionization time for the tubes which is at least equal to $(n-1)T$, while the length of each output pulse may be as large as the period T. Thus, the de-ionization time may be extended to any suitable value independently of the length and of the period of the output pulses.

The de-ionization time sufficient to avoid the full ionization of the tube again on its own upon the reappearance of the anode supply is dependent on the current which flowed through the main discharge path of the tube prior to the interrupting of the anode power supply and also on the amplitude of the anode power supply. In other words, the required de-ionization time depends on the power flowing through the tube, which means that the splitting of the pulsed power supply into $n$ phases will be particularly useful in the case of pulse distributors using gas tubes and adapted to the generation of power pulses.

Again, as for the first possibility discussed above, cyclic operation will only be possible if $m$ is a multiple of $n$. If this is not the case, a solution may of course be found in using an $m$ phase anode power supply, i.e. an individual pulsed power supply for each tube. This may however be rather uneconomical if $m$ is rather large and if a time substantially less than $(m-1)T$ is already suitable for the de-ionization of a tube. Further, some systems, such as a recent telephone system, use several pulse distributors each with a different number of outlets in order to generate various sets of series of control pulses. Each of the pulse distributors defines a cycle of a number of time units corresponding to the number of its outlets and together, the various pulse distributors will be able to define a much larger number of time units of period T, provided that the numbers of outlets of the various distributors are prime to one another. This means that for the most of the distributors, their number of outlets will generally be prime, whereby for each of these it would be necessary to use as many power supply phases as there are outlets. This would obviously render the power supply arrangement more expensive.

An object of this invention is to provide a relatively simple arrangement of electrical pulse distributors or ring counters of the type initially defined and in which the number of outlets $m$ is not a multiple of $n$.

In accordance with a characteristic of the invention, when $m$ is not a multiple of $n$, $p$ pulse distributors or ring counters, as initially defined above, are paralleled, like switches of the $p$ pulse distributors corresponding to the same outlet, $p$ being equal to $n$ divided by the highest common denominator of $m$ and $n$, e.g. $p=n=2$, and the $p$ distributors being cyclically operated one after the other and one at a time.

The above described and other objects and characteristics of the invention will be better understood with reference to the following description of embodiments to be read in relation with the accompanying drawings which schematically represent:

Fig. 1, two electrical pulse distributors each comprising five switches;

Fig. 2, two electrical pulse distributors each comprising six switches; and

Fig. 3, two associated pulse distributors each comprising an odd number of switches and interstage couplings being provided between adjacent switches.

In Fig. 1, $m$, the number of switches such as $S_1$, is equal to 5, $n$, the number of groups, is equal to 2 and $p$, the number of pulse distributors, is also equal to 2. The outlets are represented by the terminals $P_{1/5}$, and, as indicated, terminal $P_1$ is fed from the two switches $S_1$ and $S_6$, similar connections being made for the remaining terminals. The first pulse distributor comprises the switches $S_{1/5}$ while the second consists of the switches $S_{6/10}$. In both distributors, alternate switches, such as $S_1$ and $S_2$, are fed from two different phases of the two phase push-pull power supply at terminals $A_1$ and $A_2$. Neither these pulses nor the input pulses are represented in the drawing, but if there is no priming between successive stages, one may assume that there are five series of phase staggered input pulses each with a period 5T, the first series of input pulses being applied to the switches $S_1$ and $S_6$, the second to the switches $S_2$ and $S_7$, etc. In this manner, the ten switches $S_{1/10}$ will be operated in sequence in the numerical order given, and when using gas tubes for the switches, each will benefit from a de-ionization time equal to at least T.

Fig. 2 represents an arrangement similar to that of Fig. 1, but the number of switches $m$ is now equal to 6 while the number of groups or power supply phases is now equal to 4, which means however that there are still only two 6-outlet pulse distributors required. Of course, with two phases only, since the number of outlets is even, a single distributor would be suitable, but with four phases, the de-ionization time has now been extended to at least 3T which might be useful especially when the frequency of operation is rather high.

Fig. 3 shows a generalisation of the arrangement of Fig. 1, and in more detail. The first distributor comprises the switches $S_{1/m}$ where $m$ is odd, while the second comprises the switches $S_{m+1/2m}$. These switches are alternatively in reversed positions on top of one another for the various stages, such as $ST_1$, $ST_2$, etc., of which only the first has been shown in some detail, since they are all identical, in order to group those switches which are fed from the same power supply phase out of the two. Each stage such as $ST_1$, has been shown to include a gate, such as $G_1$, at the input of the corresponding switch $S_1$, and this gate, together with the gate $G_{m+1}$ at the input of the corresponding switch of the second distributor, is fed from the output of a delay device $D_1$ of which the input is connected to the output of stage $ST_m$ and hence to the last output terminal $P_m$. The wave forms appearing at terminals $A_1$ and $A_2$ are indicated, together with the wave forms of the trigger pulses appearing at terminal $B_1$ and $B_2$ and respectively derived from the pulses at $A_1$ and $A_2$, which terminals are connected to the gates, such as $G_1$, corresponding to the switch, such as $S_1$, to which the corresponding power supply phase, such as $A_1$, is connected. In this way, upon an output pulse appearing at one of the outlets, such as $P_m$, while the supply voltage at $A_2$ is high, this output pulse will, as shown, be suitably delayed by the device $D_1$, so that at the output of this device a pulse will appear in a time location which is such as to suitably straddle the trigger pulse $B_1$ derived from the phase pulse $A_1$. Hence, this trigger pulse will be able to flow through the gate $G_1$ and close the switch $S_1$, or in other words ionize the gas tube constituting this switch, whereby the next output pulse will be generated at terminal $P_1$.

It should be noted that the delay devices, such as $D_1$, may be provided in common for the two pulse distributors. On the other hand, it is useful to split the output of the delay device, such as $D_1$, towards two separate gates, since, although a single gate could be used per outlet with only one source of trigger pulses, its output would necessarily be connected to the two following switches, such as $S_1$ and $S_{m+1}$. In such a case, the trigger pulse having passed through the common gate would trigger the gas tube which happens to receive a suitable voltage at its anode, but the other tube of which the anode is at that time low, would nevertheless have its main discharge path de-ionization process retarded due to the ionization of its auxiliary discharge path by the appearance of the trigger pulse at its control grid.

While the principles of the invention have been described above in connection with specific apparatus, it is to be clearly understood that this description is made only by way of example and not as a limitation on the scope of the invention.

What is claimed is:

1. Electrical pulse distributor system comprising a plurality of $p$ electrical pulse distributors, each comprising a plurality of $m$ switches, each switch having an outlet, means responsive to the receipt of a sequence of input pulses for cyclically closing said switches, one after the other and one at a time, so that they may produce a series of output pulses at said $m$ outlets, respectively, said $m$ switches being divided into $n$ groups, where $n$ is larger than 1 and smaller than $m$ and $m$ is not a multiple of $n$, such that for any set of $n$ switches which are successively operated, each of these switches pertains to a different group, said $p$ pulse distributors being paralleled, like switches of the $p$ pulse distributors corresponding to the same outlet, $p$ being equal to $n$ divided by the highest common denominator of $m$ and $n$, and connecting means for said distributors, whereby the $p$ distributors are cyclically operated one after the other and one at a time.

2. Electrical pulse distributor system, as claimed in claim 1, and wherein the switches are constituted by gas tubes having a main discharge path and an auxiliary discharge path and wherein the maintenance of an established state of high conductivity depends on the potential difference across the main discharge path, said system further comprising an $n$ phase pulse power supply, the gas tubes pertaining to a same group having their main discharge paths fed from one particular phase of said power supply, each phase providing pulses of period $nT$, means connected to each switch for closing said switch only upon the joint presence of a pulse from the corresponding phase together with an input pulse timed to appear across the auxiliary discharge path of the tube during the time of application of the pulse across the main discharge path, and means for maintaining said tube ionized until the end of the pulse across its main discharge path, whereafter said tube is left to de-ionize during a time substantially equal to $(n-1)T$.

3. Electrical pulse distributor system, as claimed in claim 1, in which the means for cyclically closing the switches comprises means connected to each switch for delaying a pulse produced thereby, and means for causing said delayed pulse to control the closure of the succeeding switch, the same delaying means being used in common for the switches of the $p$ distributors which correspond to the same outlet.

4. Electrical pulse distributor system, as claimed in claim 3, in which each phase of input pulses corresponds with a phase of the power supply for the main discharge paths of the tubes, each phase of input pulses being used to trigger the tubes fed by the corresponding phase of power supply.

References Cited in the file of this patent

UNITED STATES PATENTS

| | | |
|---|---|---|
| 2,709,771 | Dehn | May 31, 1955 |
| 2,810,098 | Pearce et al. | Oct. 15, 1957 |
| 2,816,249 | Brightman | Dec. 10, 1957 |
| 2,828,447 | Mauchly | Mar. 25, 1958 |
| 2,831,150 | Wright et al. | Apr. 15, 1958 |
| 2,837,641 | Geisler | June 3, 1958 |
| 2,851,636 | Beesley | Sept. 9, 1958 |